(12) United States Patent
McCall

(10) Patent No.: US 11,148,744 B2
(45) Date of Patent: Oct. 19, 2021

(54) REUSABLE CUP FOR CABLE LUBRICATION

(71) Applicant: Clark Edward McCall, Ann Arbor, MI (US)

(72) Inventor: Clark Edward McCall, Ann Arbor, MI (US)

( * ) Notice: Subject to any disclaimer, the term of this patent is extended or adjusted under 35 U.S.C. 154(b) by 478 days.

(21) Appl. No.: 16/168,070

(22) Filed: Oct. 23, 2018

(65) Prior Publication Data

US 2020/0122801 A1   Apr. 23, 2020

(51) Int. Cl.
| | |
|---|---|
| *B62J 31/00* | (2006.01) |
| *F16C 1/24* | (2006.01) |
| *D07B 7/12* | (2006.01) |
| *F16N 7/00* | (2006.01) |
| *F16N 7/02* | (2006.01) |
| *F16N 3/02* | (2006.01) |

(52) U.S. Cl.
CPC .............. *B62J 31/00* (2013.01); *D07B 7/12* (2013.01); *F16C 1/24* (2013.01); *F16N 7/00* (2013.01); *F16N 3/02* (2013.01); *F16N 7/02* (2013.01); *F16N 2210/34* (2013.01)

(58) Field of Classification Search
CPC ... B62J 31/00; D07B 7/12; D07B 7/14; F16C 1/24; F16N 7/00; F16N 3/02; F16N 7/02; F16N 2210/34; F16N 3/00; F16N 7/28; F16N 3/10; F16N 2210/33
USPC ...... 184/14, 15.1–19, 21, 24, 65, 88.1, 88.2, 184/96, 109
See application file for complete search history.

(56) References Cited

U.S. PATENT DOCUMENTS

| | | | | |
|---|---|---|---|---|
| 1,102,965 | A * | 7/1914 | Smith | D06B 1/14 |
| | | | | 118/234 |
| 1,285,588 | A * | 11/1918 | Bakke | F16N 21/06 |
| | | | | 184/88.1 |
| 1,509,906 | A * | 9/1924 | Sawtelle | E21B 33/072 |
| | | | | 184/15.1 |
| 1,576,159 | A * | 3/1926 | Timmerman | D07B 7/12 |
| | | | | 184/15.1 |
| 3,951,235 | A * | 4/1976 | Acerbi | F16N 11/06 |
| | | | | 184/15.1 |
| 4,066,147 | A | 1/1978 | Toyomoto | |
| 4,422,529 | A * | 12/1983 | Johansen | B66D 1/28 |
| | | | | 184/15.1 |
| 4,545,161 | A | 10/1985 | Dewyer | |
| 4,619,298 | A | 10/1986 | Broussard | |
| 4,671,385 | A | 6/1987 | Travis | |
| 4,891,037 | A * | 1/1990 | Maples | B62J 31/00 |
| | | | | 184/15.1 |
| 5,107,961 | A | 4/1992 | Schott | |
| 5,662,189 | A | 9/1997 | Anderson | |
| 6,234,539 | B1 | 5/2001 | Foster | |
| 6,799,661 | B1 | 10/2004 | Tapscott | |

(Continued)

FOREIGN PATENT DOCUMENTS

GB            825301   B1   12/1959

*Primary Examiner* — William V Gilbert

(57) ABSTRACT

A device facilitating the lubrication of cable housings comprising a reservoir for liquid lubricant, a radial longitudinal slot, a cinching flap to hold the device in place and assure a secure seal, and a hole shaped to allow the use of a single device with cable housings of different types. The present invention relates to the maintenance of mechanical cable systems, especially the lubrication of bicycle cable systems.

1 Claim, 5 Drawing Sheets

(56) References Cited

U.S. PATENT DOCUMENTS

| | | |
|---|---|---|
| 9,638,239 B2 | 5/2017 | Scott |
| 2016/0138703 A1* | 5/2016 | Doran ................ F16H 57/0436 184/15.2 |
| 2017/0002856 A1 | 1/2017 | Scott |

* cited by examiner

REUSABLE CUP FOR CABLE LUBRICATION

CROSS REFERENCE TO RELATED APPLICATIONS

None.

FEDERALLY SPONSORED RESEARCH

None.

SEQUENCE LISTING

None

BRIEF SUMMARY OF THE INVENTION

A device facilitating the lubrication of cable housings comprising a reservoir for liquid lubricant, a radial longitudinal slot, a cinching flap to hold the device in place and assure a secure seal, and a hole shaped to allow the use of a single device with cable housings of different types.

BACKGROUND

The following is a tabulation of some prior art that presently appears relevant:

| U.S. Patents | | | |
|---|---|---|---|
| Pat. No. | Kind Code | Issue Date | Patentee |
| 4,066,147 | B1 | 1978 Jan. 3 | Toyomoto |
| 4,545,461 | B1 | 1985 Oct. 8 | Dewyer |
| 4,619,298 | B1 | 1986 Oct. 28 | Broussard |
| 4,671,385 | B1 | 1987 Jun. 9 | Travis |
| 5,107,961 | B1 | 1992 Apr. 28 | Schott |
| 5,662,189 | B1 | 1997 Sep. 2 | Anderson et al. |
| 6,234,539 | B1 | 2001 May 22 | Foster |
| 6,799,661 | B1 | 2004 Oct. 5 | Tapscott, Jr. |
| 9,638,239 | B1 | 2017 May 2 | Scott |

| U.S. Patent Application Publications | | | |
|---|---|---|---|
| Publications Nr. | Kind Code | Publ. Date | Applicant |
| 2017/0002856 | A1 | 2017 Jan. 5 | Scott |

| International Patents | | | |
|---|---|---|---|
| Publications Nr. | Kind Code | Publ. Date | Applicant |
| GB825301 | A1 | 1959 Dec. 16 | Griffin |

Bowden cable systems, or simply, cable systems, are used to control mechanical motion remotely. One application of cable systems is to control braking and gear shifting on bicycles.

Bicycle brakes and shifter apparatus movement are controlled by the bicycle rider's movement of the control, e.g., squeezing the brake lever or moving the gear shift control. The cable tension increases or decreases when the rider moves the control. The change in tension in the cable causes the movement of a controlled component at the far end of the cable.

In the case of actuating a bicycle rim brake, the rider squeezing a brake control lever results in an increase in cable tension which moves a brake arm to force a brake pad to come into contact with the rim of the wheel, resulting in the bicycle slowing down. When the rider releases their grip on the brake lever the brake pad is no longer forced into contact with the rim.

In the case of a bicycle gear shifting system, when the rider moves the shift controls in one direction or the other the shift cable experiences a decrease or an increase in tension. This change in tension results in moving a linkage, typically in a derailleur system, at the opposite end of the cable which results in changing of gear ratios by moving the drive chain from one sprocket to another.

Bicycle cable systems consist of a flexible inner cable surrounded by a coaxial outer sheath or housing. The cable is made up of multiple twisted strands of steel wire. The housing consists of an outer plastic layer surrounding an inner layer made of spirally wound steel. Bicycle cables and cable housings come in a variety of outside diameters.

Each end of a cable housing may also have a ferrule, concentric to the housing, made of either plastic or metal that provides a termination of the cable housing. The cable is attached on one end to a brake or shift control via a swaged head which may be of a standard type. The other end is clamped via a releasable cable clamp on the corresponding brake or shift component that is being controlled. The releasable cable clamp is positioned so that the positioning of the cable and cable housing is such that the brake and shifting component operate as intended.

Some bicycles use a continuous piece of cable housing from the control to the component being controlled. To save weight and cost, reduce friction, and simplify maintenance, many bicycles do not use a continuous piece of cable housing between the control and the controlled component. They may instead use rigid sections of the bicycle frame in place of some segments of the housing. This is facilitated by cable stops attached to the frame. A cable stop consists of a socket to receive an end of a cable housing segment, and a small hole through which the inner cable can pass, but the housing cannot. Segments of a cable system between cable stops have only a bare cable, that is, the cable is exposed where it runs from one cable stop to a mating cable stop. The compressive force that is otherwise borne by the cable housing is borne by the bicycle frame in these sections. The cable stops are oriented in opposite directions in order for each cable stop to properly accept the cable housing. In most cases the cable stop includes an axial longitudinal slot to allow the cable to be released from the cable stop without the need to unthread the cable through the hole in the cable stop.

Bicycle cables are not effective for conveying compressive forces. When used in compression they tend to collapse or to buckle. For this reason, cables on bicycles are designed to be in tension at all times. A spring in the controlled component provides this tension. The spring is designed to be forceful enough to overcome friction in the system. This spring force must be overcome by the rider's hand motion when the movable control component is actuated. Therefore, this spring is designed to exert a force small enough so as to be easily overcome by riders with different hand size and strength and to not result in hand fatigue. Further, the spring force must be great enough to overcome friction in all of the moving parts when the parts are new and also any added friction after the parts have been in use. Because of these design requirements, cable systems have a limited amount of friction in the system that can be tolerated before the operation of the controlled component is impaired. For this reason it is desirable to provide a method to reduce this friction as it increases due to a bicycle being in use.

Shift and brake cable controls on bicycles sometimes in their life may develop symptoms of operating in a sluggish manner or being unable to move. This is often the result of high friction between the cable and the cable housing due to lack of lubrication between the cable and the housing or corrosion of the cable or housing or contamination between the cable and housing or all of these.

Designing a system with stronger spring tension would decrease the sensitivity of the system to friction. For reasons already described spring tension is constrained and simply increasing spring tension is not a satisfactory remedy.

One method of fixing the problem of a cable system with excessive friction is replacing the cable and the housing. This method is often used in retail bicycle repair shops. Replacing the cable and housing is an expense due to the cost of the replacement cable and housing and also the cost for the labor to remove the old cable and housing and the labor to install and adjust the replacement cable and housing. In many cases the cable and housing are undamaged and exhibit unacceptably high friction because they are not adequately lubricated. Thus, a method of lubricating a cable and cable housing to avoid unnecessary replacement of the cable or cable housing is desirable. Further, a method of lubricating a cable and cable housing that does not require disconnecting the cable or cable housing is desirable so that the labor of reconnecting and adjusting the cable and cable housing is avoided.

Another method of fixing the problem of a cable system with excessive friction is to completely remove the cable from the cable housing, manually apply lubricant to the exterior of the cable, and then reinsert the cable into the housing. Since this process requires removing the cable and therefore disturbing the cable adjustment, this solution incurs a similar labor cost as for replacing the cable and housing.

U.S. Pat. No. 4,545,461 to Dewyer (1985), U.S. Pat. No. 4,619,298 to Broussard (1986), U.S. Pat. No. 4,671,385 to Travis (1987), U.S. Pat. No. 6,234,539 to Foster (2001), U.S. Pat. No. 6,799,661 to Tapscott, Jr. (2004), U.S. Pat. No. 9,638,239 to Scott (2017) and U.S. application 2017/0002856 (Scott), teach sealing off a free end of cable and cable housing and then pressurizing the cable housing end in the presence of lubricant so that the lubricant will be forced along the inside of the cable housing between the cable and the cable housing for the purpose of saturating the cable and inside of the cable housing with lubricant.

These seven devices rely on an elevated pressure to force the lubricant along the cable and cable housing. Cable housings, especially cables that have been in use, may not be airtight, due to abrasion or a cut in the cable housing outer layer. For this reason these devices may not be effective for lubricating the entire length of a cable since it may not be possible to maintain the desired elevated pressure throughout the length of the cable.

These seven devices require access to a free end of cable and housing. Cable systems are implemented on modern bicycles in such a way that there may be a plurality of separate cable housing segments between the control component and the controlled component. Certain segments of cable housings are in the mid-section of the cable system and are not contiguous with other segments of cable housing. Therefore, those cable housing segments are captive, that is, there is no access to an open end of these segments of cable housing without removing the cable and housing system from the bicycle. Since these seven devices require access to a free end of cable and housing, they are not usable on cable systems that use multiple segments of cable housing without removing the cable and cable housing from the bicycle.

U.S. Pat. No. 5,662,189 to Anderson, et. al., (1997) shows a device for lubricating a cable system that consists of a top plate and a bottom plate that together with suitable gaskets enclose a segment of cable housing for the purpose of lubricating the cable and housing. The tool is intended to seal around the cable housing and also seal around the cable. The device does not require a free end of a cable and cable housing. To use the device requires a number of steps by a trained technician. According to Anderson, an access hole must be cut through the outer layer of the cable housing, then the tool must be aligned and clamped to the cable housing. Assuming all necessary interfaces are sufficiently sealed, lubricant can then be provided under pressure via a lubrication port.

This invention has a number of disadvantages. Cutting through the outer layer compromises the integrity of the cable housing. When the operation is complete, the housing needs to be cleaned and a suitable sealant applied to the hole that was made in the cable housing outer layer. This device requires a plurality of top and bottom plates and gaskets to accommodate different size cable and cable housings. Because of the complexity of the steps involved, the use of this tool would need to be preceded by some training and practice. For these reasons this device is not well suited for quickly and inexpensively lubricating a bicycle cable.

Each of the devices described so far requires pressurizing the lubricant.

International Patent GB825301 (A) (1959) to Griffin shows a device with a hinge on one end and two handles on the other ends, that can be placed over a cable and cable housing and is designed to form a pressure proof seal over the cable and cable housing that pass through it. This device does not require access to an open cable end. This tool appears to be heavy, in part to provide the stiffness and the force to seal the cable against the pressure of the lubricant.

U.S. Pat. No. 5,107,961 to Schott (1992) shows a tool that is intended to seal around a cable housing and also seal around the cable. This tool does not require having access to a free cable housing end.

This device is designed to be installed by being slipped over a segment of cable that is not covered by cable housing. To accomplish this, an uncovered segment of cable housing equal to or greater than the length of the longitudinal dimension of this device is needed. Such an uncovered segment of cable may not be available on a particular cable application. This tool relies on a pressurized source of lubricant.

Schott shows multiple diameters in the sleeve that clamps over the cable housing. Verifying that the Schott device is optimally clamped on a cable housing cannot be performed visually because the elastomer clamping piece is hidden from view when the device is being installed for use.

The Schott device has at least four different parts. The parts must be made of at least two different materials. This tool makes use of one or two threaded fasteners that must be screwed into place in order to use the unit.

Devices that rely on forcing a lubricant into the housing under pressure rely on a tight seal between the device and the cable housing to prevent leaking so that the lubricant will be forced into the cable housing.

All of the previously described devices rely on a seal between the device and the cable and cable housing that can withstand the elevated pressure used to deliver the lubricant. To achieve this seal requires a selection of sealing parts that are adequately matched to the size of any given cable and cable housing being serviced and a sufficient force applied to hold the sealing parts together.

U.S. Pat. No. 4,066,147 to Toyomoto (1978) shows placing a piece of felt as an lubricant reservoir in series with the brake cable housing tension path. The felt serves as a lubricant reservoir. Lubricant is pressed out of the felt to lubricate the cable when the cable system is put under tension. The lubricant delivery is not regulated. Lubricant is released whenever the cable system is under tension whether or not lubricant is needed, thereby wasting lubricant. This system would add compliance to the system due to the compression of the housing due to the felt being in the path of the force transmission from the control handle to the controlled brake component. Compliance is an undesirable trait in cable systems because it increases the required amount of movement of the control for a given movement in the controlled component.

Typical modern bicycles have four independent cable systems and included with these, between four and seven cable housing segments that may need to be lubricated. The typical four independent cable systems control the front derailleur, the rear derailleur, the front brake and the rear brake. Because of the high number of cable housing segments there is a need for a lubrication system that can be installed quickly and easily.

One method of lubricating a bicycle cable and cable housing is to release a segment of cable housing from its cable stops and wrap a piece of adhesive tape circumferentially around the open end of the cable housing with one edge of the tape surrounding the housing and the other edge protruding from the end of the housing. With the open end of the housing pointing up this forms a small reservoir into which lubricant can be placed so that it can flow down between the cable and the cable housing. This method has a number of disadvantages. It takes some time and effort to cut a small piece of tape. It takes some amount of dexterity to successfully wrap a piece of tape around something as small as the cable housing, especially in what may be a dirty and oily environment. The adhesive on most tapes is not resistant to oil, so the lubricant may dissolve the adhesive on the tape, causing the release of the tape from the cable housing, causing the tape to slip down the cable housing or to drop off the cable housing, thus releasing the oil and making a mess.

A similar method makes use of a plastic bag as a reservoir. Preparation consists of cutting off a bottom corner of a plastic bag, inserting the end of a cable housing into the bag through the cutoff corner and securing the bag to the housing using a rubber band. Lubricant can then be poured into the bag and allowed to flow down into the cable housing. This method requires access to a free cable end. This method is time consuming and messy.

Another method of lubricating a bicycle cable can be used when a particular segment of cable housing can be released from its cable stops and can be moved back and forth along the cable. In these cases, a technique can be used wherein a user repeatedly applies some lubrication to the cable housing open end and to the cable, then moves the cable housing segment back and forth along the cable. With this method the user does not have a clear indication that the inside of the cable housing segment has been saturated with lubricant. This method cannot be used in situations where the cable housing segment is not free to be moved back and forth along the cable, for example on a bicycle front brake cable.

Advantages of the Present Device

An improved device for lubricating a cable consists of a means to retain lubricant while the lubricant is being dispensed, a method of lubricating a cable whereby a lubricant reservoir is provided to a cable and cable housing, a means to seal the device to the cable housing, a means to view the lubricant as it is being delivered to the cable and housing, and is made with a minimum of parts so that manufacturing cost may be kept low.

Further, an improved device would be lightweight so that it can be installed and used while the cable housing segment is temporarily oriented vertically to allow gravity to force the lubricant into the housing segment, and while the device does not, due to its weight, distort the desired temporary orientation of the cable housing segment. Further, the device would accommodate a plurality of cable housing sizes, would be usable without removing the cable or cable housing in a way that requires cable readjustment upon completion of lubrication, is easy to learn to use, and is not degraded by contact with common lubricants and chemicals found around bicycles. Further, an improved device would not require the use of pressurized lubricant so as to be of a burden to the environment and would be able to be quickly fitted and removed from a cable housing segment and would not have any of the described drawbacks of the prior art.

Further, if the tool is flexible it can be cleaned of lubricant by enclosing it in an absorbent rag and rolling the tool around in the rag.

Thus some embodiments provide a means to effectively lubricate a bicycle cable that is easier and faster to install and remove than the prior art. Some embodiments provide a means to lubricate a bicycle cable that is easy to clean and may be made from a flexible material and as a single piece. These and other benefits of one or more aspects will become apparent from a consideration of the ensuing description and accompanying drawings.

SUMMARY OF THE INVENTION

The present device provides a means to effectively lubricate a bicycle cable and overcome the limitations of the prior art. Implementation of the present device may include one or more of the following features. The present device clamps around a cable housing segment and has a lubricant reservoir that is open at the top to allow it to be filled and to allow easy examination of the lubricant level. Further, the present device may have a taper in the exit hole or other configurations where the seal is made to the cable housing segment to allow sealing of the device to the cable housing segment. Further, the device may have an axial longitudinal slot and be flexible, so that it can be installed without access to a free end of a cable housing segment and does not need a long exposed segment of cable for installation, but can be installed by being slid over either a cable or over a cable housing segment. Further, an embodiment may be manufactured as a single piece, and can be made from a flexible material such as polysiloxane, also known as silicone, or other suitable material.

Figure 1:
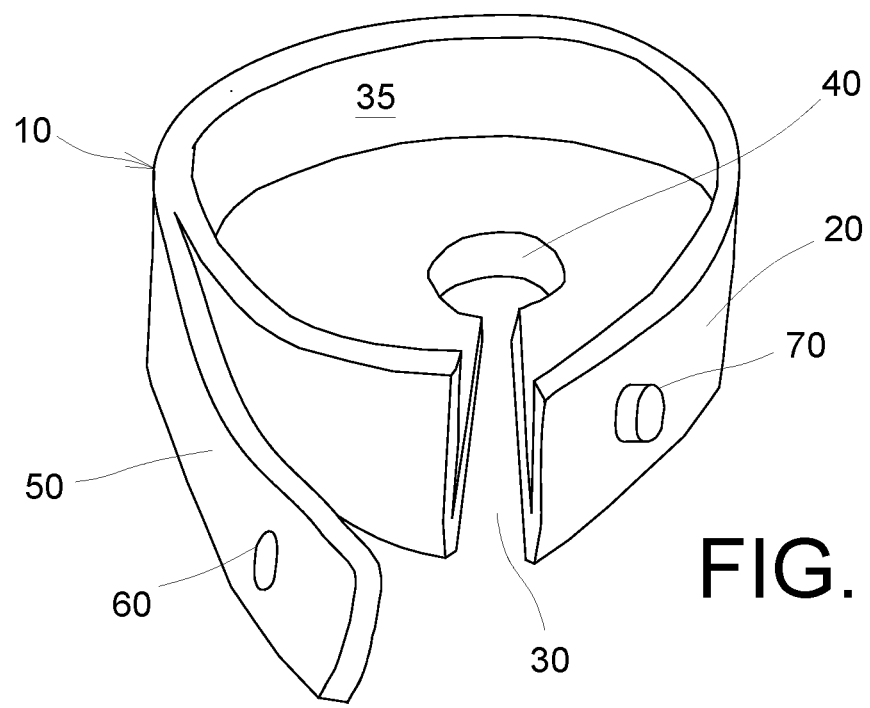
FIG. 1 is a top view perspective drawing of a preferred embodiment of the present device.

DRAWINGS—REFERENCE NUMERALS 10 cable lubrication device
20 outer wall
30 radial longitudinal slot
35 lubricant reservoir
40 lubricant exit hole
42 tapered lubricant exit hole showing compression against cable housing
44 stepped and tapered lubrication exit hole
46 stepped lubrication exit hole
50 cinching flap
60 locking hole
70 locking post
80 cable housing with no ferrule
82 cable housing with plastic ferrule
84 cable housing with metal ferrule
85 plastic ferrule
86 metal ferrule
90 cable
91 rear derailleur cable
92 front derailleur cable
94 rear brake cable
99 large diameter cable housing
202 top tube
204 head tube
206 front derailleur top tube cable stop at head tube
210 front derailleur cable housing segment at front derailleur control
215 front derailleur control
220 front brake cable housing
225 front brake cable control lever
228 front brake assembly
230 rear derailleur cable housing segment at rear derailleur control
235 rear derailleur control
236 rear derailleur cable top tube cable stop at head tube
237 rear derailleur cable top tube cable stop at seat tube
238 rear derailleur cable housing segment at seat tube
239 rear derailleur cable housing segment at rear derailleur
240 rear brake cable housing segment at rear brake control lever
241 rear derailleur cable stop with barrel adjuster
242 rear derailleur
245 rear brake control lever
246 rear brake cable top tube cable stop at head tube
247 rear brake cable top tube cable stop at seat tube
248 rear brake cable housing segment at seat tube
249 rear brake assembly
250 front derailleur cable top tube cable stop at seat tube
252 front derailleur cable housing segment at seat tube
254 front derailleur cable seat tube cable stop
256 front derailleur
300 rag
320 rear derailleur cable seat stay cable stop at seat tube
330 rear derailleur cable seat stay cable stop at rear derailleur
335 seat tube
340 seat stay

DETAILED DESCRIPTION OF THE INVENTION

Figure 2:
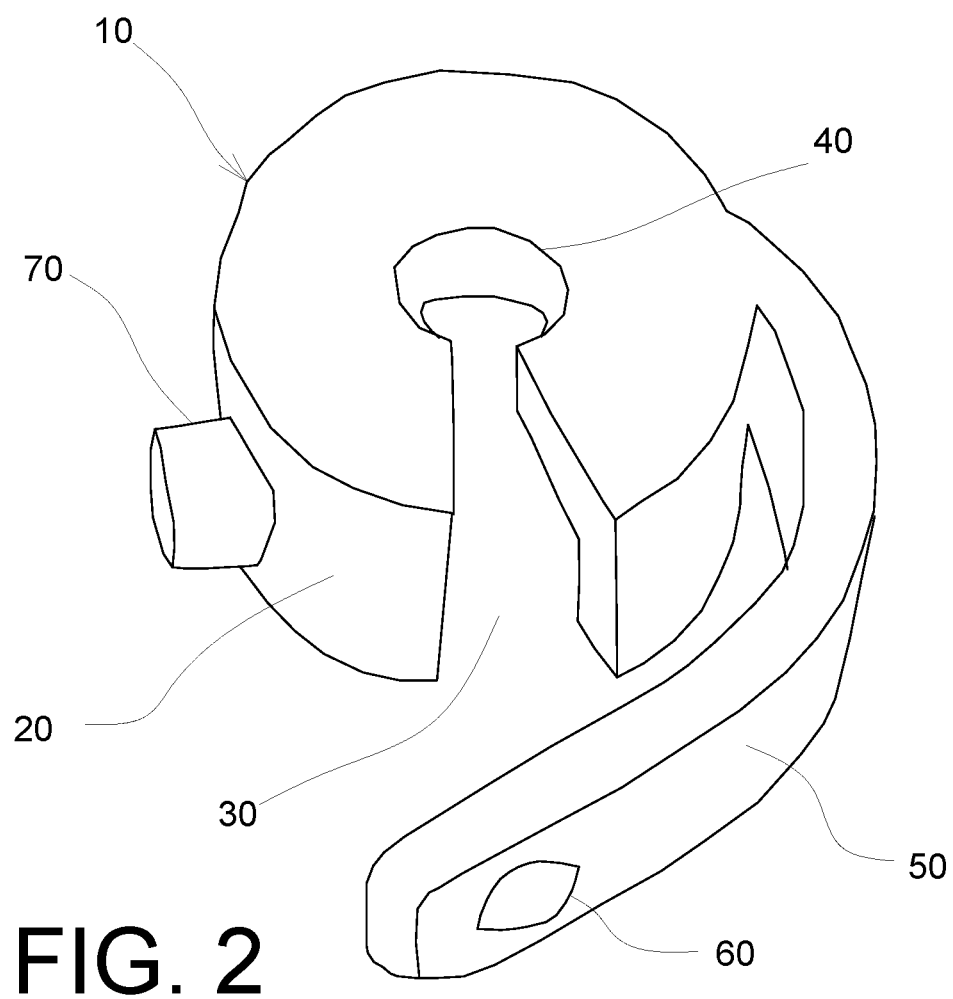
FIG. 2 is a bottom view perspective drawing of a preferred embodiment of the present device.

Referring to FIG. 1 and FIG. 2, the preferred embodiment of the cable lubrication device 10 of the present invention comprises an outer wall 20, a lubricant exit hole 40, a radial longitudinal slot 30 oriented to allow the device to be slid over a cable and cable housing, a cinching flap 50, a locking hole 60 and a locking post 70.

Figure 3:
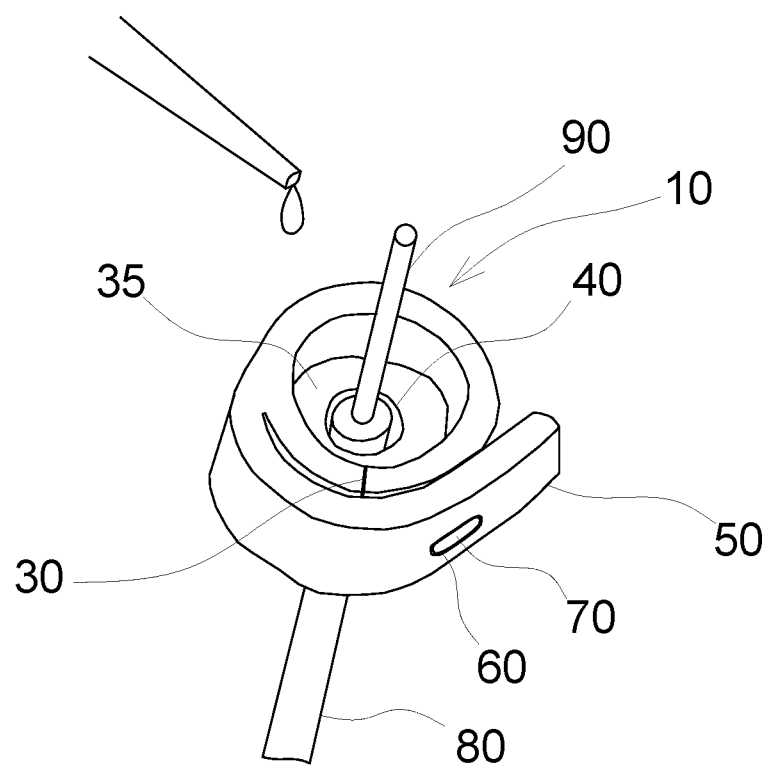
FIG. 3 is perspective drawing of a preferred embodiment of the present device, showing it in place on a cable and cable housing.

FIG. 3 shows the cable lubrication device installed on a cable and cable housing. The slot 30 is held closed and the device is held against the cable housing due to locking hole 60 in cinching flap 50 overlaying locking post 70.

Figure 4A:
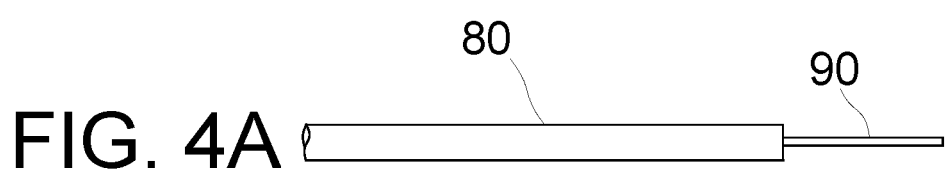
FIG. 4A, 4B, 4C are side views of different types of cable housing terminations.
Figure 4B:
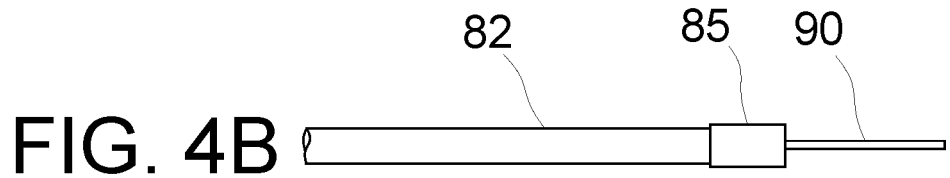
Figure 4C:
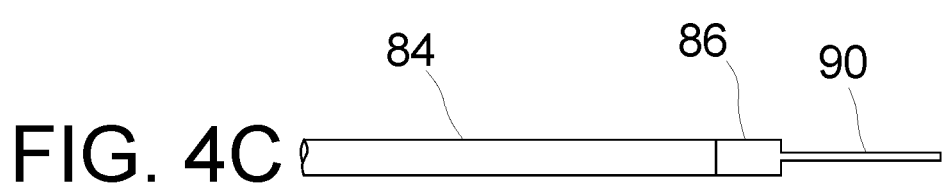

Cable housing is manufactured with different outside diameters and with different types of termination. The terminating end of a cable housing may have a different diameter due to the different outside diameter of different cable housings and due to different type of ferrules used for cable housing termination. FIG. 4A shows cable housing 80 terminated with no ferrule. FIG. 4B shows cable housing 82 terminated with a plastic ferrule 85. FIG. 4C shows cable housing 84 terminated with a metal ferrule 86.

Figure 5:
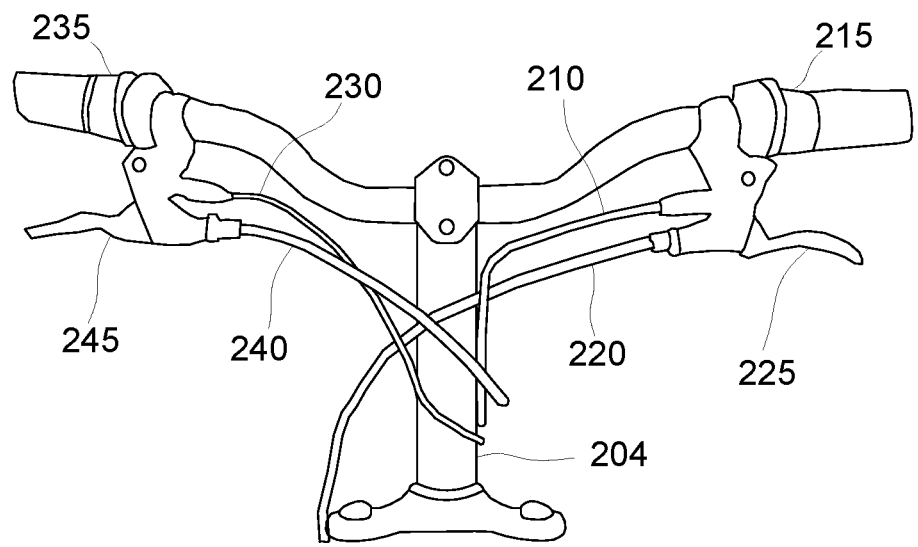
FIG. 5 is a drawing showing cable housing segments used at the front of a bicycle.

FIG. 5 shows cable systems used on a typical bicycle. Each cable system used on a bicycle connects a control to a controlled component. Front brake control lever 225 is connected to front brake cable housing 220. Front derailleur control 215 is connected to the front derailleur cable housing segment at front derailleur control 210. Rear derailleur control 235 is connected to rear derailleur cable housing segment at rear derailleur control 230. Rear brake control lever 245 is connected to rear brake cable housing segment at rear brake control lever 240.

Figure 6:
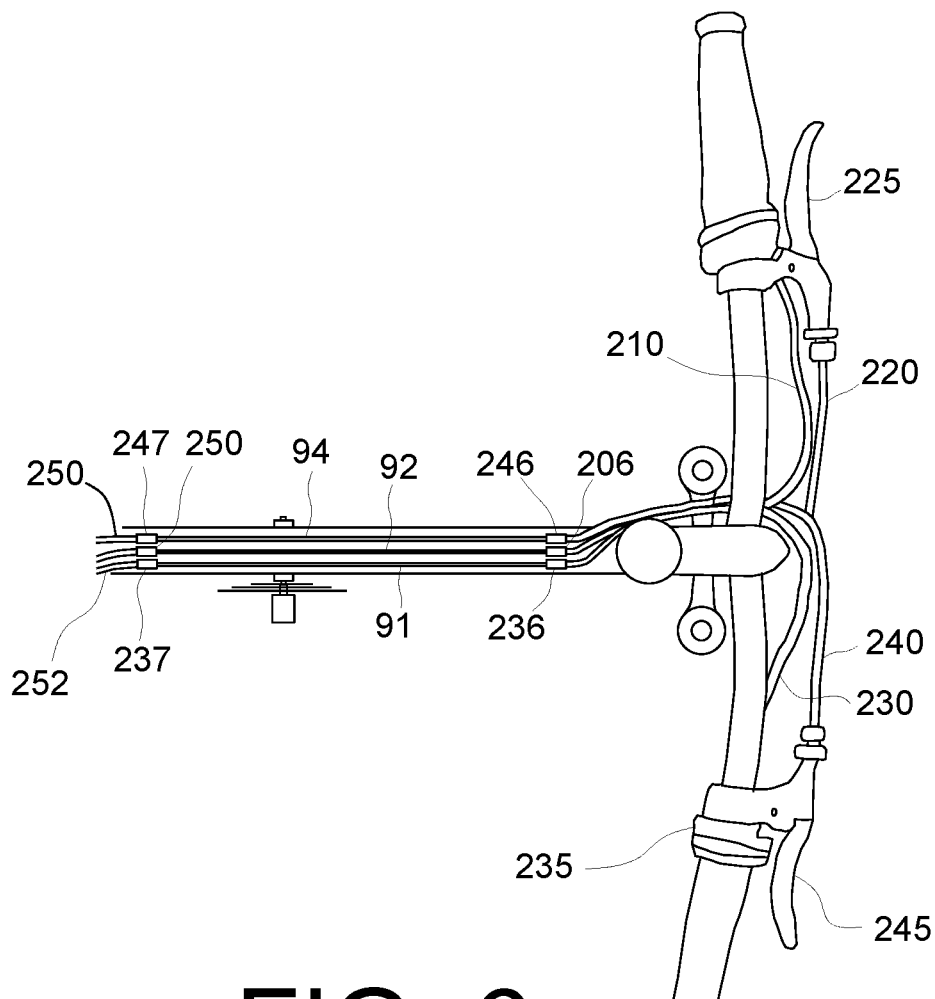
FIG. 6 is a top view of a bicycle showing cable and cable housing segments used for brakes and shifters of a bicycle.
Figure 7:
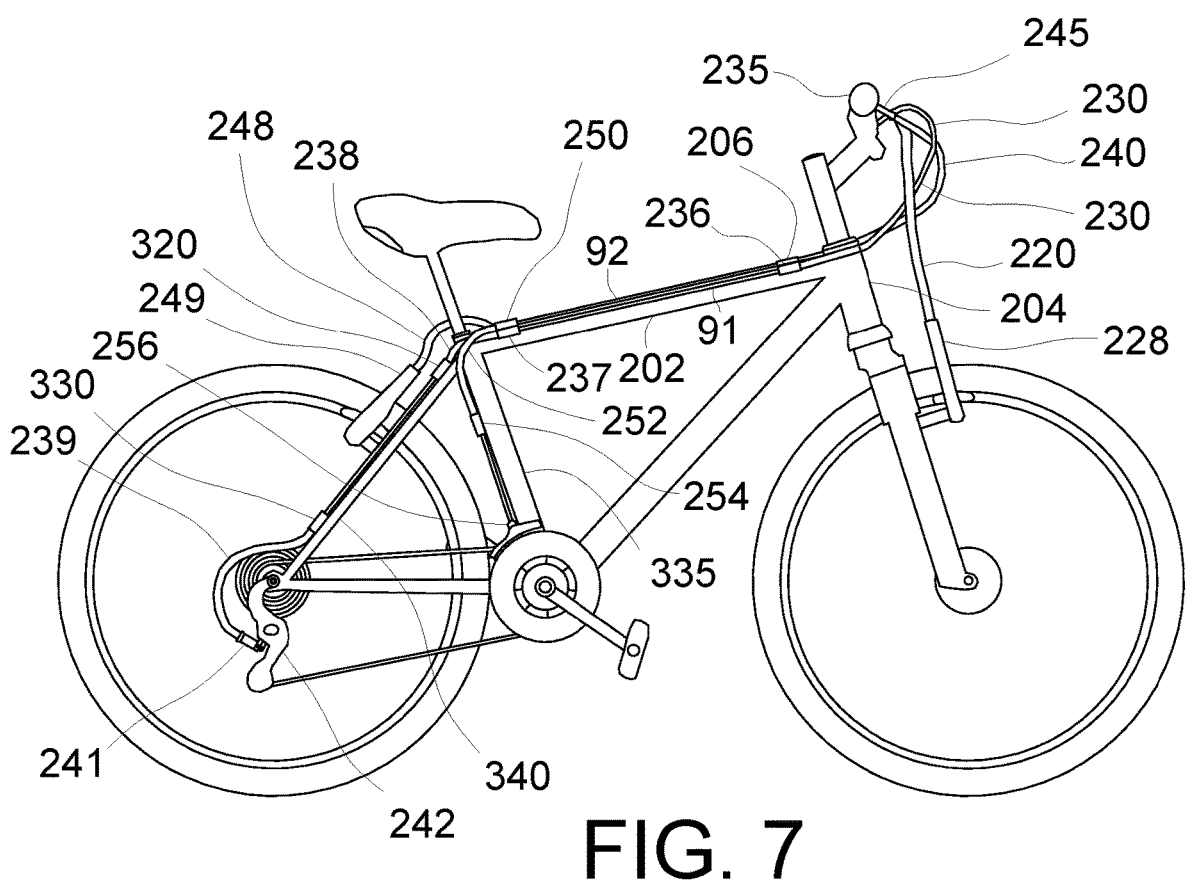
FIG. 7 is a side view of a bicycle showing cables, cable housing segments and cable stops on a bicycle.

FIG. 6 and FIG. 7 show cables and cable housing segments used on a typical bicycle. Rear derailleur control 235 is attached via a continuous rear derailleur cable 91 to a corresponding controlled component, rear derailleur 242. Rear derailleur cable 91 passes through rear derailleur cable housing segment at rear derailleur control 230, rear derailleur cable top tube cable stop at head tube 236, rear derailleur cable top tube cable stop at seat tube 237, rear derailleur cable housing segment at seat tube 238, rear derailleur cable seat stay cable stop at seat tube 320, the rear derailleur cable seat stay cable stop at rear derailleur 330, the rear derailleur cable housing segment at rear derailleur 239, the rear derailleur cable stop with barrel adjuster 241 and is clamped to the rear derailleur 242.

Front derailleur control 215 is attached via a continuous front derailleur cable 92 to a corresponding controlled component, front derailleur 256. Front derailleur cable 92 passes through front derailleur cable housing segment at front derailleur control 210, front derailleur top tube cable stop at head tube 206, front derailleur cable top tube cable stop at seat tube 250, front derailleur cable housing segment at seat tube 252, front derailleur seat tube cable stop 254, and is clamped to the front derailleur 256.

Rear brake control lever 245 is attached via a continuous rear brake cable 94 to a corresponding controlled component, rear brake assembly 249. Rear brake cable 94 passes through rear brake cable housing segment at rear brake control lever 240, rear brake cable top tube cable stop at head tube 246, rear brake cable top tube cable stop at seat tube 247, rear brake cable housing segment at seat tube 248, and terminates at rear brake assembly 249.

Front brake control lever 225 is attached via a continuous front brake cable to front brake assembly 228. The front brake cable passes through front brake cable housing 220.

Each of these cable housing segment ends has some exposure to outside contaminants such as moisture and dirt. This contamination may increase friction between the cable and cable housing. Providing lubrication to the inside of the cable housing is effectively done using the present device.

Operation

Figure 8:
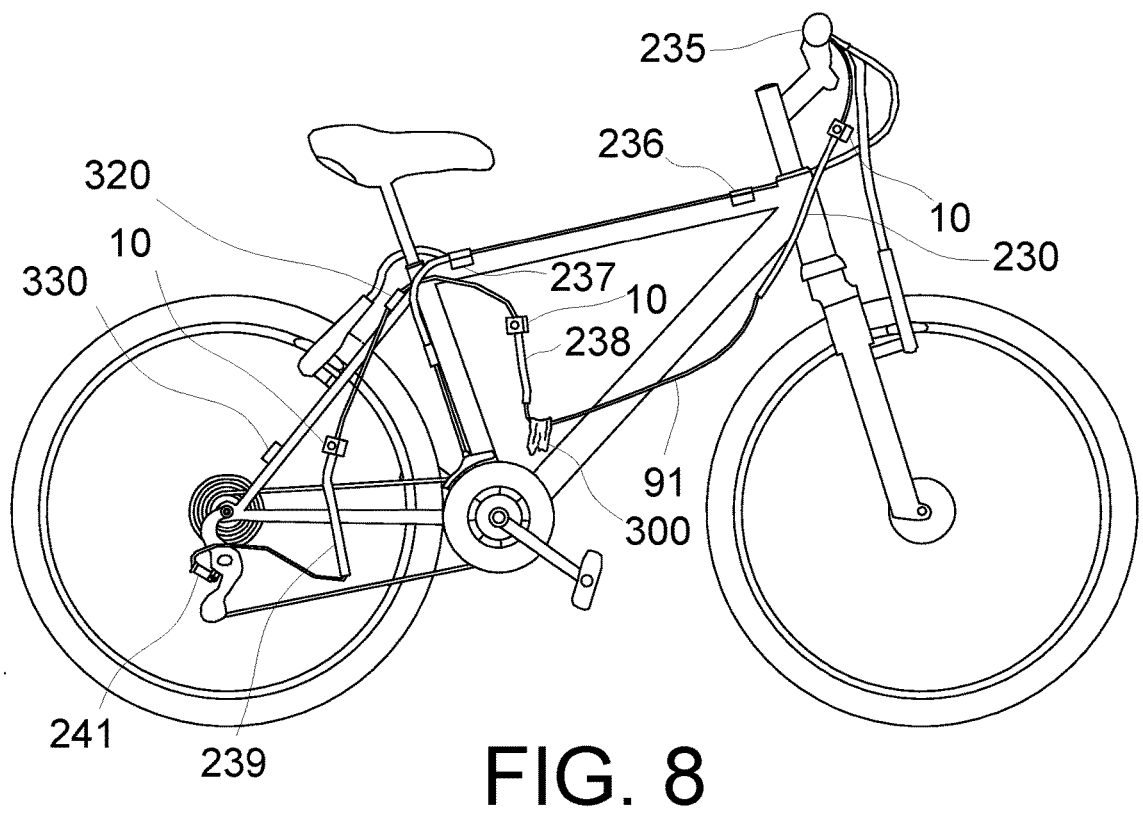
FIG. 8 is a side view of a bicycle showing a preferred embodiment mounted on cable housing segments on a bicycle as it would be in use.

To use the cable lubrication device of the present device, a bicycle cable and cable housing segment are released from their cable stops and a cable lubrication device is installed on each cable segment to be lubricated. FIG. 8 shows rear derailleur cable and rear derailleur cable housing segments positioned to be lubricated using the cable lubrication device. The three rear derailleur cable housing segments 230, 238 and 239 have been released from the rear derailleur control 235 and their cable stops 236, 237, 320, 330, and 241. The cable housing segments are advantageously arranged in a temporary fashion so that each segment has one end higher than the other end. Cable lubrication devices 10 are installed on each of the cable housing segments 230, 238, 239 by spreading open the slot 30 and sliding the device over the cable and cable housing segment. The locking hole 60 on cinching flap 50 is then stretched over and pushed down onto locking post 70. In a preferred embodiment the pressure of the mounted device 10 around the cable housing segment 230, 238, 239 with the cinching flap 50 in place over the locking post 70 is sufficient to hold the device in place on the cable housing segment during the lubrication process. Positioning of the cable housing segments may be aided by placing a weight, such as a rag 300, on some part of the cable while the rear derailleur cable 91 is hooked on a suitable part of the bicycle such as rear derailleur cable seat stay cable stop at seat tube 320 as shown in FIG. 8. The cable lubrication device 10 is of sufficiently low weight that it does not disturb the temporary positioning of the cable housing segment.

With a cable lubricator device 10 in place on each of the cable housing segments 230, 238, 239, as shown in FIG. 8, liquid lubricant can then be provided to the volumes formed by the lubricant device reservoir 35, the cable housing segments 230, 238, 239 and the cable 91. The lubricant can then run out of the reservoir 35 and down into the cable housing segments 230, 238, 239. Completion of the flow of lubricant through any cable housing segment can be verified by examining the cable below the cable housing segments to see whether the cable has been wetted by the lubricant. Alternatively, if there is sufficient exposed cable, the cable lubricant device 10 filled with lubricant, while still connected to a cable housing segment, for example cable segment 238, along with the cable housing segment 238, can be moved up and down the cable to facilitate the distribution of oil along the cable.

The prior example describes the lubrication of a rear derailleur control cable and rear derailleur cable housing segments. A similar description applies for the lubrication of other cables and cable housing segments.

The prior description is intended to describe a possible implementation and use of the present invention but is not intended to restrict the invention to only this description.

A preferred method for using the cable lubrication device is to arrange a cable housing segment to be lubricated such that one end of a segment of cable housing segment is higher than the other to facilitate the flow of lubricant by the force of gravity. This method is well suited to bicycles, where the cable systems are typically accessible and can be temporarily reoriented.

The diameter to which the cable lubricating device must seal may vary due to different manufacturers, whether the cable is a shift control cable or a brake control cable, and due to the presence or absence of a ferrule at the end of the cable housing. FIG. 4A shows cable 90 and cable housing 80 terminated with no ferrule. FIG. 4B shows cable 90 and cable housing 82 terminated with a plastic ferrule 85. FIG. 4C shows cable 90 cable housing terminated with metal ferrule 86.

Figures 9A, 9B:
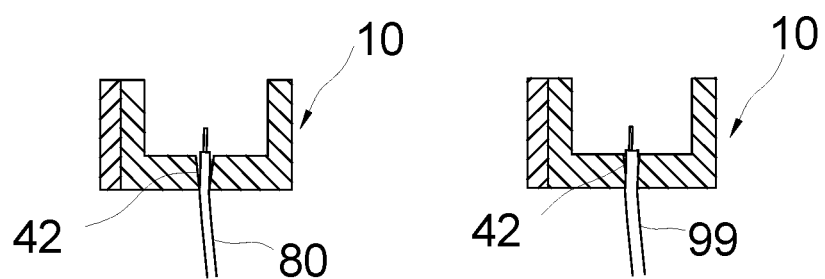
FIGS. 9A, 9B, 9C, and 9D are section views of a preferred embodiment showing different types of lubricant exit holes.
Figures 9C, 9D:
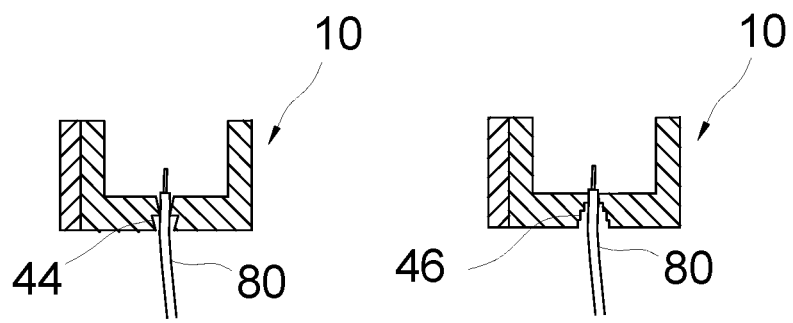

FIGS. 9A, 9B, 9C, and 9D show cross section views of the cable lubrication device with different hole characteristics that may be advantageous in achieving a seal between the cable lubrication device and the cable housing sufficient to avoid leaking of lubricating fluid during use. FIG. 9A shows a cable lubricating device 10 with a tapered lubricant exit hole 42 with a cable housing 98 in place. FIG. 9B shows a large diameter cable housing 99 in use with the same tapered hole 42 of FIG. 9A. In FIG. 9B the lubricant exit hole is compressed and sealed against the large diameter cable housing 99. FIG. 9C shows a stepped and tapered lubrication exit hole 44 which may be a desired shape to accommodate cable housings of different diameters. FIG. 9D shows a stepped diameter lubricant hole 46 which may be a desired shape to accommodate cable housings of different diameters.

It can be seen from the preceding description that a method and device for lubricating cable has been provided that offers a number of advantages over the prior art. The cable lubrication device comprises a lubricant reservoir that is open on the top to facilitate filling with lubricant and allows the level of the lubricant in the reservoir to be observed and therefore the progress of lubricant flow into the cable housing to be monitored. As the level of lubricant decreases, the user is provided visual confirmation that the lubricant is draining into the cable housing.

In a preferred embodiment the cable lubricating device is molded as a single piece from a suitable material such as polysiloxane. This provides for a device that has enough elasticity such that it makes a seal around the cable housing that is adequate to prevent the lubricant from leaking out. Because the device can be made of flexible material it can be cleaned by rolling it in a rag. The device can be manufactured so that it weighs less than 15 grams and can therefore be placed on a cable housing and not pull the cable housing segment out of the temporary positioning of the cable housing segment as shown for example in FIG. 8, which position may be desirable for allowing gravity to force the flow of lubricant into the cable housing segment. The device could be made in a plurality of sizes to fit cable housings with different diameters.

The preferred method of use relies on gravity to pull the lubrication from the cable lubrication device down into the cable housing. Prior art devices are designed to be used with lubricants under pressure, for example, lubricant in a pressurized can. It is desirable to avoid using pressurized lubricant because this avoids the inconvenience, expense and environmental impact of using a pressurized lubricant.

Because the device is made as a single piece, it can be made less expensively than a device that consists of multiple parts. The device saves time over devices that must be screwed into place because it slips over a cable and does not require disassembly and later re-assembly of the cable or cable housing system.

Because bicycle cable controls for derailleurs and brakes often have multiple cable housing segments it is an advantage that the present embodiment of the reusable cup can be installed and removed quickly. It is further an advantage that the reusable cup does not need to be monitored or held in place while the lubricating fluid is draining from the device into the cable housing. This allows the user to put multiple lubrication devices in place and then allow the lubricant to flow into the cable housing segments without further intervention by the user. It is a further advantage over prior art that the present device does not require access to an open end of a cable and cable housing, but can be placed on a cable housing while the cable is still left in place at both ends, and that the cable does not need to be adjusted as part of the process of cable lubrication when using the device.

While I have shown and described the embodiment in accordance with the present invention, it should be clear to those skilled in the art that further embodiments may be made without departing from the scope of the present invention.

CONCLUSION, RAMIFICATIONS, SCOPE

A cable lubrication device has been described that in a preferred embodiment offers improvements over prior art. Specifically, the present device:

Can be made light in weight because it does not need to withstand elevated lubricant pressure. The light weight facilitates temporarily re-orienting cables and cable housing segments to allow gravity to move lubricant into the cable housing.

Utilizes non-pressurized lubricant—therefore minimizes bicycle maintenance cost over devices requiring pressurized lubricant.

Allows quick installation and removal—does not require any complex operation such as threading or screwing to put into place and use.

Ease of use—does not require extensive training to use.

Ease of installation—does not require any tools to install. Can be installed on any segment of housing. Does not require access to a free segment of housing.

Saves money—reduces the need to replace cables and cable housings.

Versatility—usable on wide range of bicycle and cable geometries—the present device can be put into place and used when as little as no bare cable is accessible and can be used on cable housings with a variety of diameters. Device allows for back and forth movement along the cable to distribute the lubricant when extended bare segments of cable are available.

Simplicity—single piece, single material construction and no metal parts, leading to a lower cost to manufacture.

Easy to clean—because the device can be made flexible it can be cleaned by rolling it in a rag.

Long life—can be manufactured out of materials that will not degrade when exposed to common lubricants and will not break when dropped.

Prior art devices like the Cable Luber are typically used on the cables of motorized vehicles such as motorcycles and four wheelers. Those cables are difficult to access and cannot be released from their mounting points. For this reason they cannot be placed into different orientations for service where gravity is used to force lubricant into the cable housing.

In conclusion, insofar as I am aware, there is no tool available that allows a technician to quickly and effectively lubricate a bicycle cable system with the cable system in place on the bicycle.

What is claimed is:

1. A single-piece cable lubrication device, comprising:
a lubricant reservoir bottom surface;
an outer wall extending from a perimeter of said bottom surface and terminating in a free distal edge, said outer wall having an inner surface and an outer surface, said bottom surface and said outer wall defining a reservoir and said free distal edge defining a perimeter of an open top;
an opening in said bottom surface;
a longitudinal slit extending from said opening to said free distal edge;
a cinching flap extending from said outer surface and having a locking hole extending through a thickness of said cinching flap;
a locking post extending from said outer surface;
whereby said cable lubrication device is configured to be placed around a cable housing via said longitudinal slit, said cable housing is configured to be received in said opening, said cinching flap is configured to stretch across a portion of said longitudinal slit that extends along said outer wall, and said locking hole is configured to be pushed onto said locking post.

* * * * *